United States Patent

[11] 3,560,806

[72] Inventors Shoei Kataoka; Hideo Yamada; Shosan Iida; Hiroyuki Fujisada, Tokyo, Japan

[21] Appl. No. 698,234

[22] Filed Jan. 16, 1968

[45] Patented Feb. 2, 1971

[73] Assignee Agency of Industrial Science and Technology Tokyo, Japan a corporation of Japan

[32] Priority Jan. 21, 1967, Mar. 15, 1967, June 2, 1967, July 4, 1967, July 4, 1967, Aug. 3, 1967, Aug. 12, 1967, Dec. 4, 1967, Dec. 12, 1967, Dec. 12, 1967

[33] Japan

[31] 42/3, 872, (utility model) 42/21, 180, 42/34, 888, 42/42, 552, 42/42, 553, 42/49, 499, 42/51, 470, 42/77, 370, 42/79, 260, 42/79, 261

[54] MAGNETIC INDUCTIVE SEMICONDUCTOR DEVICE

14 Claims, 37 Drawing Figs.

[52] U.S. Cl. ........................ 317/231, 317/235, 317/238

[51] Int. Cl. ........................ H01l 15/00

[50] Field of Search ........................ 317/231, 235, 23; 307/309; 310/10

[56] References Cited

UNITED STATES PATENTS

| | | | |
|---|---|---|---|
| 2,464,807 | 3/1949 | Hansen, Jr. .................... | 317/235/23 |
| 2,855,549 | 10/1958 | Kuhrt et al. .................... | 317/235/23 |
| 2,906,945 | 9/1959 | Weiss .................... | 317/235/23 |
| 3,213,359 | 10/1965 | Freytag et al. .................... | 317/235/23 |
| 3,419,737 | 12/1968 | Toda .................... | 317/235/23 |

*Primary Examiner*—James D. Kallam

*Attorney*—Kurt Kelman

ABSTRACT: A solid state inductive device comprises either a sandwich of a N-type and a P-type semiconductor with an insulating layer therebetween, or a semiconductor and a plurality of metal strips with a dielectric layer therebetween. A current electrode is connected to the opposite ends of the semiconductor and interconnect the semiconductors in the first embodiment, the metal strips being angular to the direction of the electrodes in the second embodiment. The device forms an inductive reactance between the electrodes upon application of a magnetic field in an angular direction to a side of the device.

INVENTORS
SHOEI KATAOKA
HIDEO YAMADA
SHOSAN IIDA
HIROYUKI FUJISADA
BY Kurt Kelman
AGENT INVENTORS.
SHOEI KATAOKA
HIDEO YAMADA
SHOSAN IIDA
HIROYUKI FUJISADA
BY Kurt Kelman
AGENT

PATENTED FEB 2 1971

3,560,806

INVENTORS.
SHOEI KATAOKA
HIDEO YAMADA
SHOSAN IIDA
HIROYUKI FUJISADA
BY Kurt Kelman
AGENT INVENTORS.
SHOEI KATAOKA
HIDEO YAMADA
SHOSAN IIDA
HIROYUKI FUJISADA
BY Kurt Kelman
AGENT INVENTORS.
SHOEI KATAOKA
HIDEO YAMADA
SHOSAN IIDA
HIROYUKI FUJISADA
BY Kurt Kelman
AGENT INVENTORS.
SHOEI KATAOKA
HIDEO YAMADA
SHOSAN IIDA
HIROYUKI FUJISADA
BY Kurt Kelman
AGENT Fig. 17
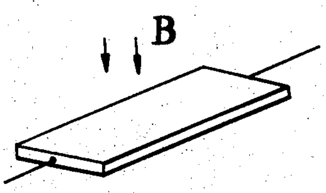
Fig. 19 B
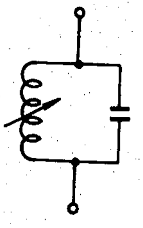
Fig. 20 B
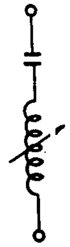
Fig. 18
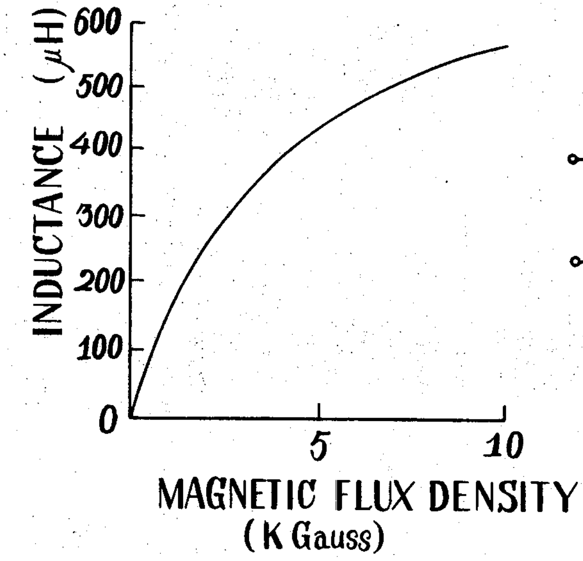
Fig. 19 A
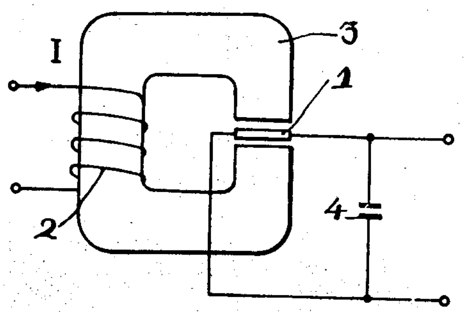
Fig. 20 A
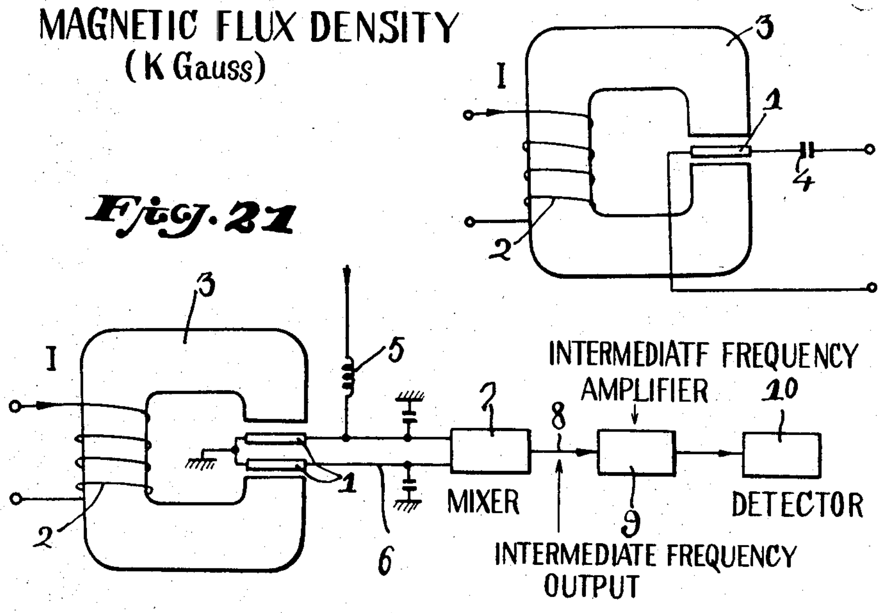
Fig. 20 A, Fig. 21
INVENTORS.
SHOEI KATAOKA
HIDEO YAMADA
SHOSAN IIDA
HIROYUKI FUJISADA
BY Kurt Kelman
AGENT

MAGNETIC INDUCTIVE SEMICONDUCTOR DEVICE

This invention relates to a magnetic inductive element which is theoretically based on the Hall effect and composed mainly of semiconductors.

It is easy to make capacitors with semiconductors, but it is extremely difficult to make inductors with them. The greatest problem in the present semiconductor technology, especially in the integrated circuit technology, is how to obtain an inductance. It is well known that diodes present an inductive effect at certain frequencies, but it is not generally applicable.

Therefore, in order to solve this problem, one of these inventors had previously invented a magneto-impedance device and attained the object. Namely, if a magnetic field is applied to a semiconductor plate or film at right angles to the current flowing through the semiconductor, a Hall voltage is generated in the direction at right angles to this current and if a suitable load is connected across the Hall terminals, a Hall current will flow.

Further, this Hall current generates a secondary Hall voltage, by the effect of the magnetic field, which is added to the terminal voltage across the current terminals of the said semiconductor.

Now, if a capacitor is connected as a load between these Hall terminals, Hall current $i$ flows in the element due to the Hall effect of the main current I flowing between the current terminals, and the phase of the former leads that of the latter.

This Hall current whose phase is advanced generates a secondary Hall voltage under the effect of the magnetic field. It is added to the voltage across the main current terminals, but as its phase leads that of the main current, the said element shows an inductance.

The equivalent circuit of such an element is generally denoted by the sum of resistive component R and reactive component X. The resistive component R is the sum of resistance $R_o$ when a magnetic field is not applied and resistance $R_B$ which is increased by the magnetic field. The reactive component X which is denoted as $X_B$ is generated only by the magnetic field and increases with it.

The above is the basic theory of the magneto-impedance device previously invented by one of these inventors. But, its shortcomings are that while a large scale of size is required for the construction of the element, the value of the generated inductance is small and the efficiency is low.

In the following will be given descriptions about the present invention, the series of the improved inventions and embodiments developed to solve these problems.

1. A multiterminal magnetic impedance element in which the Hall terminals of the magnetic impedance element are made in multiterminals so that the Hall current can be distributed in the whole element in order to generate a large reactance even under a small magnetic field.

2. A magnetic inductive element in which thin insulator layers are placed between the P-type and N-type semiconductors so that a large inductance can be generated in a small and compact size without connecting external capacitance.

2*a*. In the magnetic inductive element described in the Item 2, a magnetic inductive element in which the thin insulating layer of dielectric are provided only at both ends.

3. A magnetic inductive element in which dielectric is formed on one side or both sides of the semiconductor and on the surface of the dielectric are provided a number of metal strips at right angles to the flow direction of the main current of the semiconductor so that Hall current can circulate in the metal strips and the semiconductor across the dielectric layer(s).

3*a*. In the magnetic inductive element described in the Item 3, magnetic inductive elements in which metal strips are wider at both ends.

3*b*. In the magnetic inductive element described in the Item 3, a magnetic inductive element in which the dielectric is composed of an anodic oxidized surface of the semiconductor or of a film of vacuum vapor deposited dielectric or sputtered dielectric.

3*c*. In the magnetic inductive element described in the Item 3, a magnetic inductive element in which the dielectric layer is made thinner towards both ends.

4. A semiconductor inductor in which permanently magnetized magnetic substances are placed on the surfaces of both sides of the above semiconductor magnetic inductive element so that a magnetic field can be always applied vertically to the element.

4*a*. A permanently magnetized semiconductor inductor in which magnetic substances are provided on both sides of the semiconductor magnetic inductive element plate so that the magnetic path can pass through the element plate.

4*b*. In the permanently magnetized semiconductor inductor described in the Item 4*a*, a permanently magnetized semiconductor inductor in which the improvement of Q is attained by substituting a metal plate for the part of the element plate which contains a magnetic path of less lines of magnetic force so as to short circuit the inefficient part of semiconductor by metal.

5. Electronic tuning equipment in which a magnetic reactive element inserted into the magnetic circuit is a constituent of the tuning circuit and the reactance of the said element is controlled by varying the exciting current so that frequency tuning can be obtained without mechanical operation.

In the drawing;

FIG. 3A is a perspective view showing the construction of the magnetic inductive element of this invention composed of N-type and P-type semiconductors with dielectric layer in between.

FIG. 17 is a perspective view of the magnetic reactive element.

FIG. 18 shows a characteristic curve of the magnetic reactive element.

FIGS. 19A and 19B show an example of the magnetic reactive element which is applied to a voltage resonance-type tuning system.

FIG. 20A and 20B show an example of the magnetic reactive element which is applied to a current resonance-type tuning system.

FIG. 21 shows an example of the magnetic reactive element which is applied to a superheterodyne receiver.

Figure 1A:
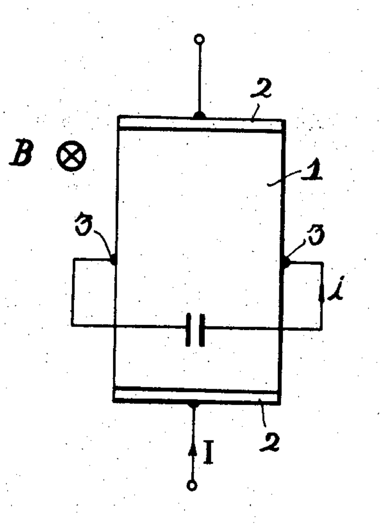
FIG. 1A is an explanatory view showing a prior art device.

As shown in FIG. 1A, when a magnetic field B is applied to the semiconductor element 1 on which current terminals 2 are provided and a capacitor is connected as a load between the Hall terminals, Hall current $i$ is caused to flow in the element due to the Hall effect of the main current I which flows between the current terminals and the phase of the former leads that of the latter.

Figure 1B:
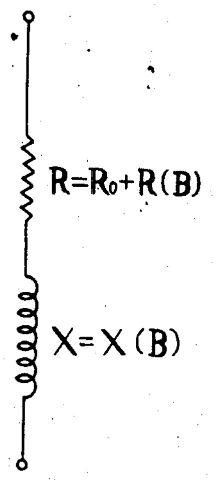
FIG. 1B shows the equivalent circuit of the above.

The secondary Hall voltage generated by the Hall current $i$ of the leading phase under the magnetic field B is added to the voltage across the current terminals, but as the phase leads that of the main current I, the element is caused to have an inductance. The equivalent circuit of such an element can be shown by FIG. 1B.

The above is the theory of the magneto-impedance device which was invented previously. This element, however, has such shortcomings as the large size in construction, small value of generated inductance and inferior efficiency.

Figure 2:
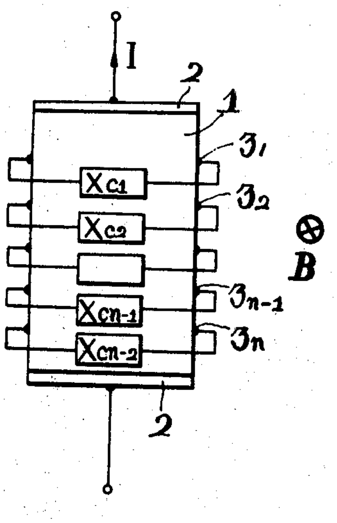
FIG. 2 is an explanatory view of another prior art device forming the multiterminal magnetic reactive element.

The present invention has been developed to solve the above problems. An improvement of the invention has been realized by providing the Hall terminals of the magneto-impedance device in the form of a multiterminal construction. As shown in FIG. 2, a number of Hall terminals $3_1$, $3_2$, —are provided on a semiconductor 1 which has a high mobility and high Hall coefficient and capacitive loads $X_{c1}$, $X_{c2}$, —are connected to the respective pairs of the terminals so as to increase the value of the inductance generated between the current terminals 2 by the applied magnetic field.

The result of a comparison between the performance of an element of this improved invention and that of a magnetic inductive element having only one pair of terminals is as follows. For instance, in the case of one pair of Hall terminals, the value of reactance $X_{in}$ generated at a magnetic flux density of 10 kg, is about 1.4Ω. In this case, as the resistance $R_1$ of the element is about 1Ω, the ratio of reactance to resistance is about 1.4.

However, according to this improved invention, if, for instance, the number of Hall terminals is taken infinitely large, the above ratio becomes about 10 at the magnetic flux density of 10 kg. This can be ascertained by experiments as well as theoretical analysis.

The above-improved invention solely concerns the method to connect external capacitors between Hall terminals, but the following improved invention forms a capacitance directly inside an element so as to utilize the Hall current which circulates in the element.

Figure 3A:
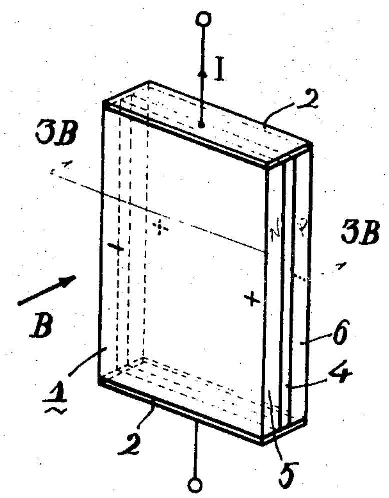
Figure 3B:
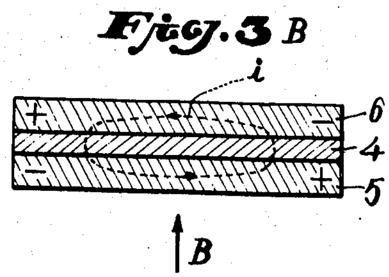
FIG. 3B is a cross-sectional view showing the distribution of the Hall current of FIG. 3A.
Figure 3C:
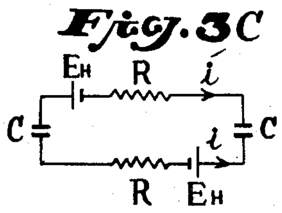
FIG. 3C shows the equivalent circuit of the above.

As shown in FIGS. 3A, 3B and 3C, the element 1 has a construction in which a dielectric layer 4 is placed in the center with an N-type semiconductor material 5 attached on its front side and a P-type semiconductor on the opposite side and common metal terminals 2 are provided on the top and bottom of them.

If a magnetic field B is applied, as shown in FIG. 3A, from the front toward the opposite side of the picture and current I is made to flow from the bottom to the top of the element, a Hall electromotive force is generated in the N-type semiconductor material 5 so that its right side becomes positive and its left side negative. However, in the P-type semiconductor material 6, as the signs of the Hall coefficient are reverse, the right side becomes negative and the left side positive (FIG. 3B).

Accordingly, when an alternating current is caused to flow in the element, the directions of the Hall electromotive forces generated respectively in the N-type and P-type semiconductor materials are opposite against each other and, therefore, the Hall current $i$ flows in a circular form across the dielectric layer 4 as shown by the dashed line in FIG. 3B.

The equivalent circuit of the above is shown by FIG. 3C. Hall current $i$ is made to flow by the Hall electromotive force $E_H$ through the capacitance which is formed by the dielectric layer. Consequently, the phase of this Hall current $i$ leads those of the main current I and the Hall electromotive force $E_H$ and as a result, the secondary Hall voltage is generated between the upper and lower current terminals 2 by the secondary Hall effect.

This secondary Hall voltage leads the main current I in phase and this element shows an inductive characteristic. The value of the inductance is a function of the applied magnetic field.

To make the above element, a thin substance of high dielectric coefficient, for instance barium titanate, etc., may be formed on or attached to the surface of a semiconductor, the semiconductor itself may be given anodic oxidization treatment to form a very thin dielectric on its surface, or a dielectric may be fixed to the surface of a semiconductor by vacuum vapor deposition or sputtering.

In actual manufacture, besides the method of providing a dielectric between a P-type and an N-type semiconductor, impurities which will become P-type may be diffused on one surface of an N-type semiconductor or impurities which will become N-type may be diffused on one side of a P-type semiconductor to form an insulator layer in between. By adopting such a method, it is possible to manufacture extremely thin elements of high efficiency.

As all the Hall effects appearing in the element are utilized, the value of the inductance obtained by the above procedures is conspicuously large compared with the case of FIG. 1 and the size of the entire element can be made extremely small and thin.

Figure 4A:
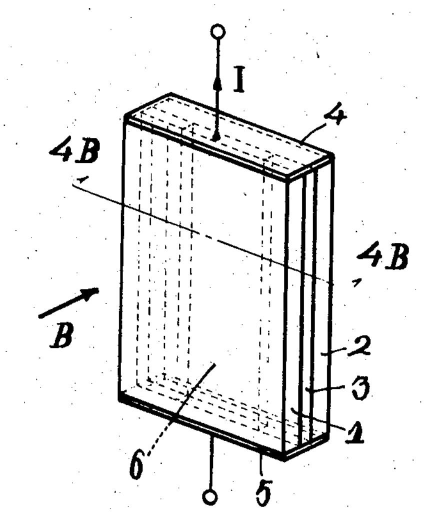
FIG. 4A is a perspective view showing another example of the magnetic inductive element.
Figure 4B:
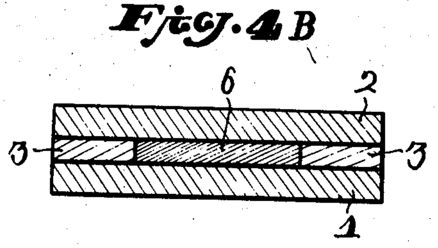
FIG. 4B is a cross-sectional view of FIG. 4A.

Since, in the above element, the Hall current in an circular form is distributed even in its central portions, the following improvements are applied to better the performance. As shown in FIG. 4, the dielectric which is to be inserted between the N-type semiconductor 1 and the P-type semiconductor 2 should be constructed in such a way that two pieces of dielectric are placed at both sides of the element keeping a space (or an insulator of low dielectric constant) in between.

Figure 4C:
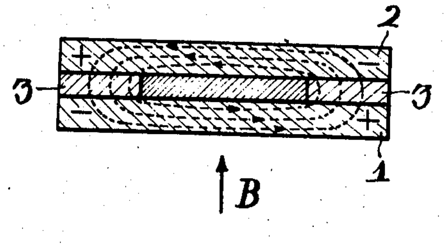
FIG. 4C is a cross-sectional view showing the distribution of the Hall current of FIG. 4A.

According to this construction, when a magnetic field is applied vertically to the element, the circular Hall current flowing in the cross section of it shows a distribution extended toward both sides as shown in FIG. 4C. Consequently, the path of the Hall current in the N-type and P-type semiconductors increases, the secondary Hall voltage generated by this Hall current becomes high and a larger inductance is obtained.

Figure 5:
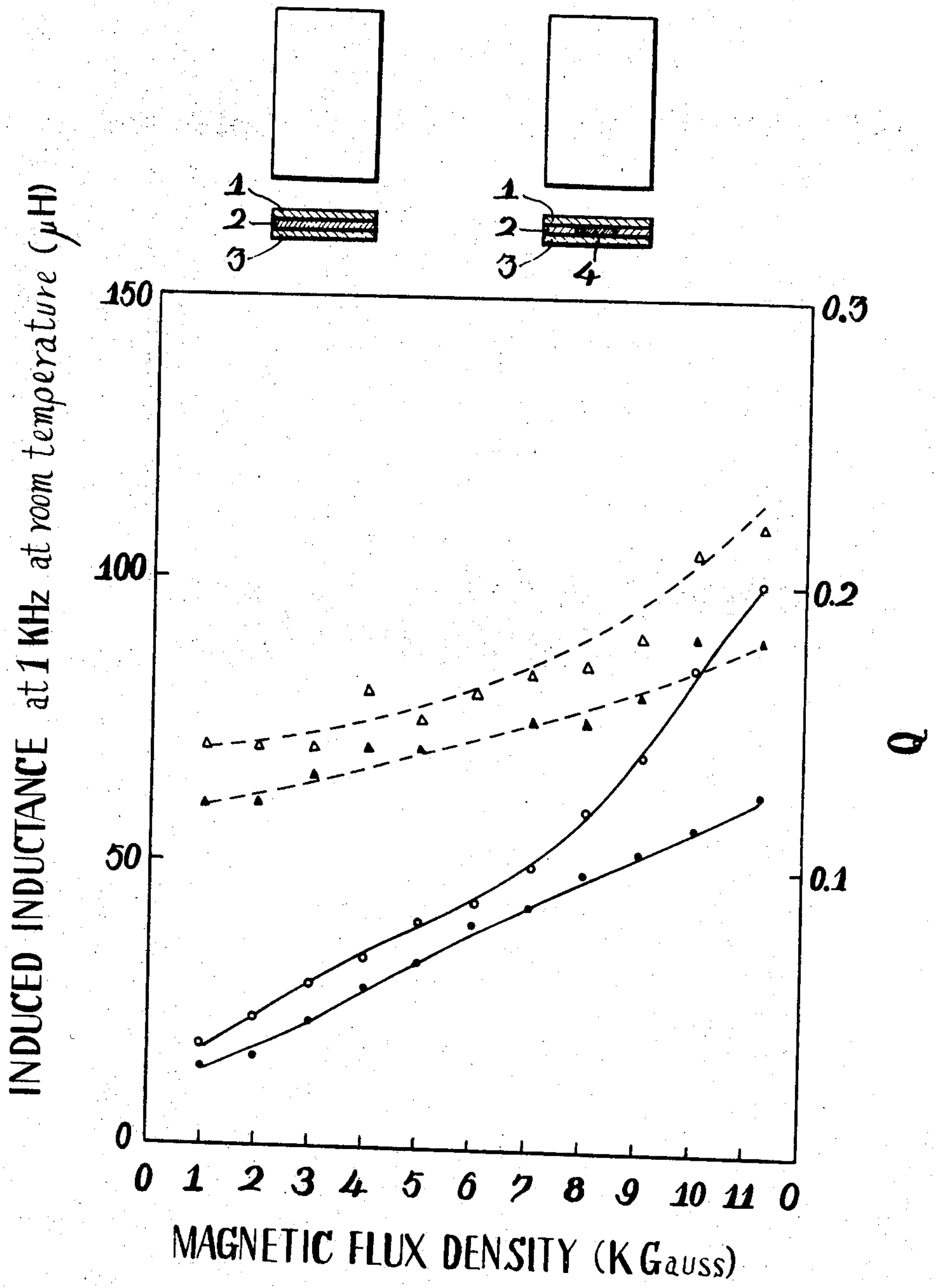
FIG. 5 shows the comparative characteristics of two different magnetic inductive elements.

To give a comparison of the above effects, FIG. 5 shows the result of an experiment conducted by using N-type InSb and P-type Ge and inserting a $BaTiO_3$ dielectric piece between them. In the FIG., the horizontal axis shows magnetic flux density B (Kg) and the longitudinal axis shows induced inductance L ($\mu$H) and also Q at room temperature and 1 kHz. "○" and "△" show the measured values for L and Q respectively when the improvements are performed, while, "●" and "▲" are their values when no improvement is made.

The technical content of this improved invention can be extended further to a semiconductor magnetic inductive element of the construction in which thin dielectric substances are provided on both sides of an N-type semiconductor material and several metal strips are placed at intervals on their outer surface.

Figure 6A:
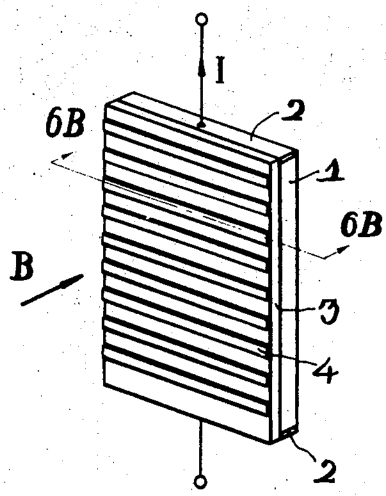
FIG. 6A is a perspective view showing the structure of the magnetic inductive element in which dielectric layers and metal strips are provided on a semiconductor.

As shown in FIG. 6, a dielectric layer 3 is formed on the surface of a semiconductor piece 1 (for instance, N-type indium-antimonide, etc.) on both the upper and lower ends of which terminals 2 are provided and on the surface of the layer are provided a number of metal strips 4 at right angles to the main current I flow direction. In this element, a Hall electromotive force $V_H$ is generated in the lateral direction of the semiconductor material 1 by the application of the magnetic field B.

Figure 6B:
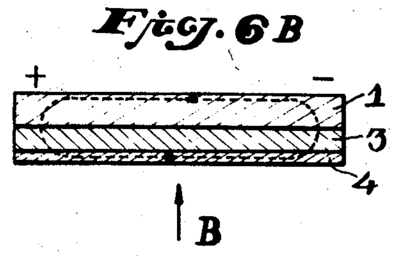
FIG. 6B is a cross-sectional view showing the distribution of the Hall current of FIG. 6A.
Figure 6C:
FIG. 6C shows the equivalent circuit of the above.

This Hall electromotive force is short-circuited by the metal strips across the layer of the dielectric 3, and as shown in the cross-sectional view of FIG. 6B, Hall current $i_H$ flows in the semiconductor element in the direction of the metal strips. The phase of this Hall current leads that of the Hall electromotive force $V_H$, namely that of the main current I. The equivalent circuit of this cross section is shown in FIG. 6C.

Therefore, the phase of the secondary Hall electromotive force which is generated by this Hall current $i_H$ is advanced and since it is applied across the current terminals 2, the phase of the voltage leads that of the current and this element presents an inductance.

Under such a construction, one kind of semiconductor suffices to complete an element. Therefore, when an N-type semiconductor of high mobility is used, the loss of the semiconductor itself can be made extremely small and it is capable of developing far more excellent performance than the previously described magnetic inductive element which employs both P-type and N-type semiconductors.

Figure 7A:
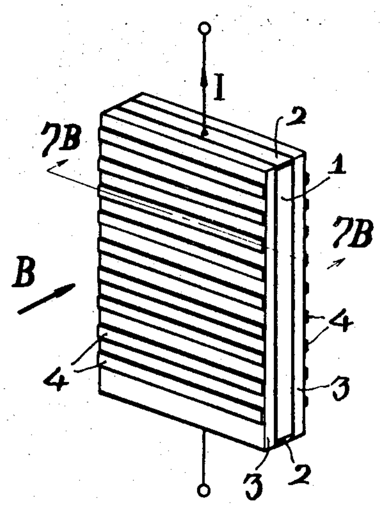
FIG. 7A is a perspective view showing another example of the magnetic inductive element.
Figure 7B:
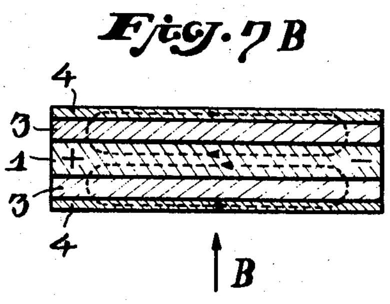
FIG. 7B is a cross-sectional view showing the distribution of the Hall current of FIG. 7A.
Figure 7C:
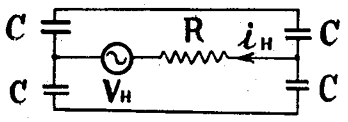
FIG. 7C shows the equivalent circuit of the above.

Besides, if such constructions as above are provided on both sides of a semiconductor, far more excellent effects can be developed. FIG. 7A shows the structure in this case, FIG. 7B is a cross-sectional view of it and FIG. 7C presents its equivalent circuit.

The metal strips should be arranged in the lateral direction in order to short circuit only the Hall electromotive force and it is necessary to maintain space between the metal strips themselves to prevent the flow of the main current through them.

These metal strips can be provided by employing the technique of electroplating, vacuum vapor deposition or printing. However, when nickel or electric conductive magnetic substances are used as the material, the generation of inductance is further improved as the material magnetizes by itself or concentrates magnetic flux.

Figure 8A:
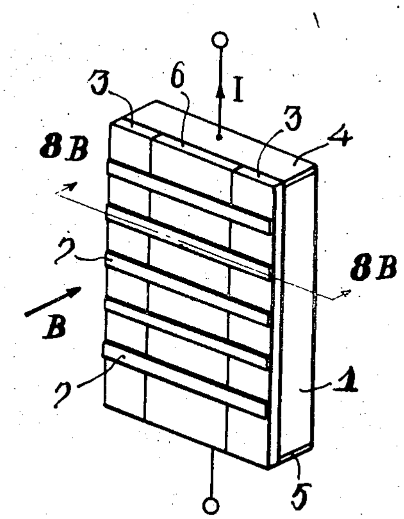
FIG. 8A is a perspective view showing another example of the magnetic inductive element.

Another improvement is shown in FIG. 8. In the center of the N-type semiconductor material 1 to which terminals 4 and 5 are attached, is mounted an insulator 6 of low dielectric constant along the direction of main current and on its both sides are fixed plates 3 of high dielectric constant. Metal strips 7 are provided on their surface in the direction of the Hall current.

Figure 8B:
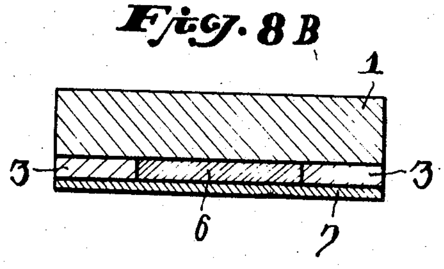
FIG. 8B is a cross-sectional view of FIG. 8A.
Figure 8C:
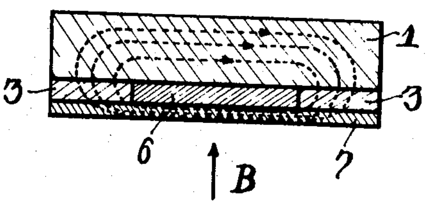
FIG. 8C is a cross-sectional view showing the distribution of the Hall current of FIG. 8A.

In this case, the cross section of the element and the distribution of the Hall current are shown in FIGS. 8B and 8C. The path of the current inside the semiconductor 1 has been enlarged and the performance has conspicuously improved.

When a magnetic field is applied, the element of the above-improved invention generates an inductance very efficiently and has a feature that the value of the inductance can be controlled by the magnetic field. It has also such excellent properties that the loss of the element itself is smaller and the value of the generated inductance is larger than the element presented by one of these inventors previously for the same purpose.

Moreover, as this element consists of the combination of only one kind of semiconductor and metallic material, its manufacture is easy; as it is extremely small, it makes it possible to realize the miniaturization and mass production when it is employed as a solid-state inductor in general electronic circuits; and it has a high reliability and the ability to control the inductance by the magnetic field. Therefore, it has a remarkably wide range of application in the electronic industry as a new product for various kinds of measurement and control.

In the above improved invention, for the dielectric layer to be formed by anodic oxidization, an InSb semiconductor, for instance, is surface polished and immersed in dilute electrolyte such as KOH as the anode and on the other hand a Mo plate or other suitable plate is immersed in the solution as the cathode. Then, when the anode and cathode are connected respectively to the positive and negative terminals of a DC power source, the semiconductor of the anode is deprived of electrons from its surface, namely, oxidization occurs on the anode. As a result, the surface is oxidized and turns into an insulating dielectric layer.

This method has the following advantages and features compared with the method to stick a dielectric piece to the surface of a semiconductor.

a. As there is no space between the semiconductor surface and the dielectric layer, the performance can be improved.

b. In the case of the sticking method, the dielectric needs some thickness, but the oxidization method makes the film extremely thin. Therefore, it is possible to obtain a large value of electrostatic capacity and, as a result, a large inductance can be induced.

c. If, while covering the metal terminals, all the other sides of the semiconductor are oxidized by the anodic oxidization method and then the metal strips are provided, the anodic oxidization film protects the semiconductor inside it and prevents the deterioration of the element due to environment.

d. For instance, in the construction of FIG. 3, a slice of the P-type semiconductor InSb′ and a slice of the N-type semiconductor InSb′ are anodic oxidized on all sides except the terminal portions 3 and then, the two slices can be struck together to form the element. Anodic oxidization of either semiconductor also suffices to construct the element.

This means that, in the manufacturing process, according to the method of sticking bulk dielectrics, three pieces must be fixed together, but according to this oxidization method, the advantage is that the element can be made by sticking only two slices together.

Besides, in the construction shown in FIGS. 6 and 7, this has the advantage of simplifying the manufacturing process.

e. In case this semiconductor magnetic inductive element is formed and assembled into a semiconductor integrated circuit or a thin film integrated circuit, this oxidization method offers the most suitable manufacturing method.

The invention which will be described below has been accomplished by improving and developing further the invention explained in the foregoing chapters.

In the above-mentioned improved invention, as there exist loop currents circulating even in the center of the semiconductor, the Hall effect in the semiconductor cannot be fully developed. This is because the uniform width of the metal strips causes a uniformly distributed capacitance to appear.

Figure 9A:
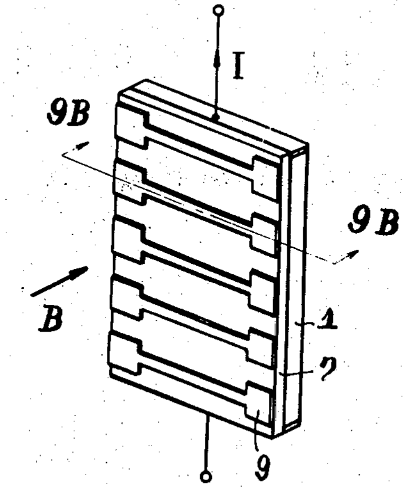
FIG. 9A is a perspective view showing another example of the magnetic inductive element.

In order to remedy this defect, in this improved invention, the metal strip 9 has a shape which is wide at both ends and narrow in the center as shown in FIG. 9. By this arrangement, the capacitance appearing between metal strips 9 and the semiconductor 1 is made large at both sides of the element and small in its center.

Figure 9B:
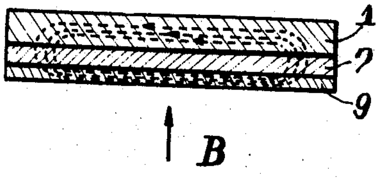
FIG. 9B is a cross-sectional view showing the distribution of the Hall current of FIG. 9A.

As a result, regarding the distribution of the Hall current in the section, the currents flowing across the dielectric 7 are mainly located in the parts near the edges as shown in FIG. 9B; therefore, the path of the Hall current flowing in the lateral direction inside the semiconductor 1 increases, the Hall effect in the semiconductor can be effectively utilized and the inductance can be generated more efficiently.

Figure 12A:
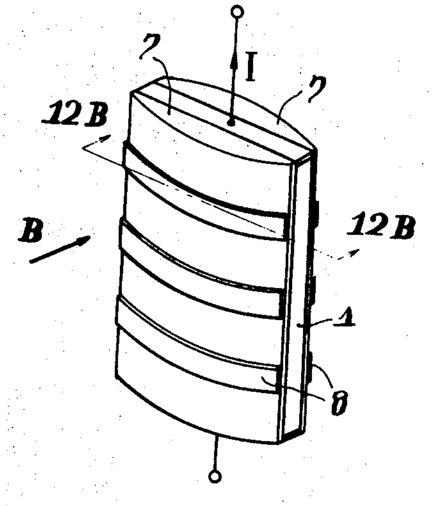
FIG. 12A is a perspective view showing another example of the magnetic inductive element.
Figure 10A:
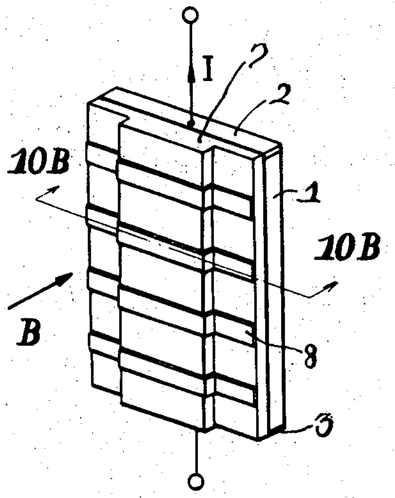
FIG. 10A is a perspective view showing the structure of the magnetic inductive element in which a dielectric has thin edges its both sides and metal strips are provided on the dielectrics.
Figure 11A:
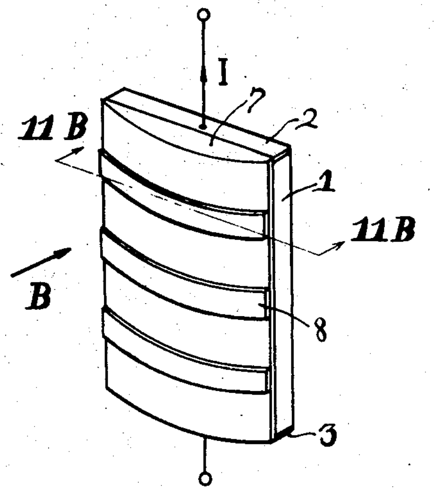
FIG. 11A is a perspective view showing another example of the magnetic inductive element.

In the above improved invention, the width of the metal strip is made wide at its both ends to allow a large capacitance to appear in these portions. But, in order to obtain the same effect as above, the next improved invention makes the dielectric layer thinner towards the edge as shown in FIGS. 10, 11 and 12.

Figure 12B:
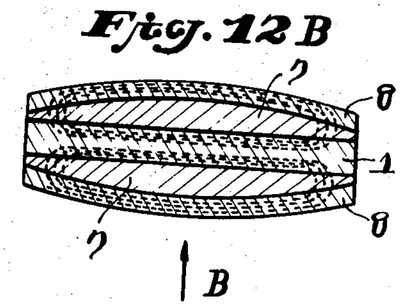
FIG. 12B is a cross-sectional view showing the distribution of the Hall current of FIG. 12A.
Figure 10B:
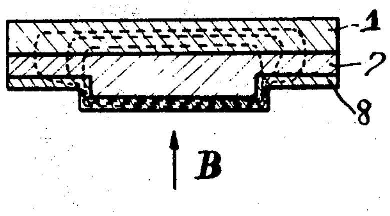
FIG. 10B is a cross-sectional view showing the distribution of the Hall current of FIG. 10A.
Figure 11B:
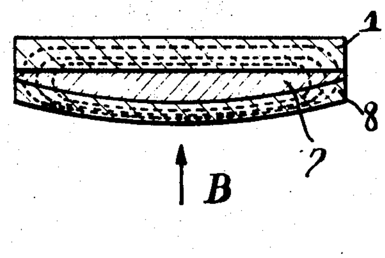
FIG. 11B is a cross-sectional view showing the distribution of the Hall current of FIG. 11A.

This arrangement makes the capacitance appearing between the semiconductor 1 and the metal strip 8 large at both sides of the element and small in its center. In this case, if a magnetic field is applied vertically, the distribution of the Hall current in the cross section becomes as shown in FIGS. 10B, 11B and 12B. Since the Hall current flowing in the lateral direction inside the semiconductor 1 increases, the Hall effect in the semiconductor can be utilized very effectively and the inductance can be generated efficiently.

As described above, in order to induce the function as inductors in the elements of these inventions, a magnetic field B must be applied vertically to them. Consequently, this invention develops into the stage to establish the construction by which a magnetic field is applied to the element.

Figure 13:
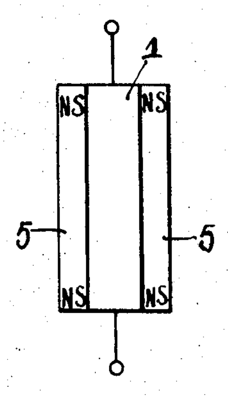
FIG. 13 is a vertical view showing the construction in which a ferromagnetic substance is provided on the sides of a magnetic inductive element and magnetized along the thickness.
Figure 14:
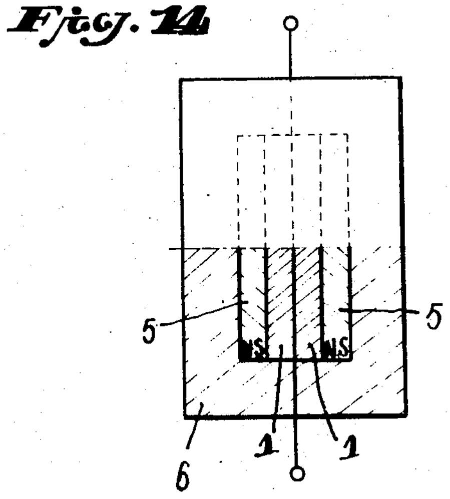
FIG. 14 is a vertical view, partly in section, which shows the above structure enclosed by a yoke.

As shown in FIG. 13, permanent magnets, for instance, ferrite magnets 5, are attached to both sides of the element 1. The whole of them may be enclosed by the yokes 6 which have high permeability as shown in FIG. 14. Especially with respect to the elements having the constructions shown in FIGS. 6 and 7, the metal strips can be permanently magnetized by applying a strong magnetic field, if they are formed by the sputtering method, vacuum vapor deposition method or electroplating method using, for instance, Ni which is a ferromagnetic substance having a large electric conductivity.

It is to be noted that the shorter the distance between the ferromagnetic substances (magnets) to be attached (the thickness of the element 1 placed between the two magnets), the greater the magnetic flux density passing through the element 1 and as a result, the induced inductance and the Q become greater. Therefore, it is desirable to make the element 1 as thin as possible.

As described above, according to this invention, the only attachment of ferromagnetic substances by the simple methods makes the application of an external magnetic field unnecessary. Besides, as the laminated element may be fixed by the permanent magnetic force, the sticking procedure can be eliminated.

However, as the above inventions are all intended to apply a given magnetic field uniformly to the semiconductor element, it is necessary, for instance, to magnetize the magnetic substances 2 along the direction of thickness as shown in FIG. 13A. Therefore, magnetic substances of considerable thickness were required to apply a magnetic field of a given value to the semiconductor.

On the other hand, in the case of the FIG. as an outer space of a considerable length is incorporated in the magnetic circuit, it is possible to use the magneticmotive force effectively by providing magnetic substances also in the external circuit as shown in FIG. 14. But, in this case, the defect is that the size of the device.

Figure 15:
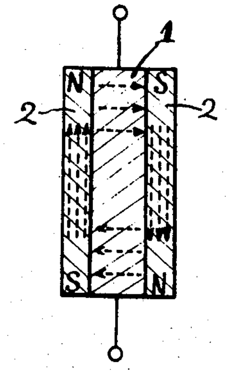
FIG. 15 is a vertical-sectional view showing the construction in which ferromagnetic substances are provided on the sides of a magnetic inductive element and magnetized along the surface.

Consequently, the next improvement over the above-improved invention is to apply a magnetic field efficiently to the semiconductor element by using thin magnetic substances and FIG. 15 shows the construction of the device for the purpose.

Since it is not necessary for the magnetic field to be applied to the semiconductor uniformly in the same direction, the magnetic substances can be magnetized along their surfaces.

Thin magnetic substances 2 are stuck lengthwise to both surfaces of the semiconductor magnetic inductive element as shown in FIG. 15 and magnetization is performed along the surfaces respectively in the opposite directions. Then, a magnetic field is applied vertically to the semiconductor element 1, although the directions of the lines of magnetic force are different in the upper half and lower half of the element.

As this magnetic circuit is almost closed by the magnetic substances 2, large magnetic fields are applied efficiently to the thin semiconductor 1. It is not always necessary that the magnetic fields applied to this semiconductor should be of a constant direction and a constant uniform amount. The reason is that as the secondary Hall effect of a semiconductor is used in this technique, the characteristic is determined by the square of the magnetic field and thus, is independent of the direction. Moreover, even if the amounts of the magnetic field applied to various parts of the semiconductor are different, non uniformity does not effects seriously.

Figure 16:
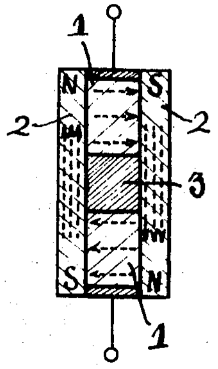
FIG. 16 is a vertical-sectional view showing a construction of another example of the above.

It is to be noted that as the magnetic field is not applied to the central part of the semiconductor element 1, it is free from the effect of the magnetic inductance and only the resistance of the semiconductor is added in series to the element; therefore, the performance of the element lowers in some degree. To prevent this defect, the parts of poor efficiency should be replaced by a metal piece 3 or short-circuited as shown in FIG. 16 and the performance can be improved.

As stated above, according to this invention, the performance of a magnetic inductance element can be improved by making it in the form of thin plate and providing magnetic substances on its both sides so as to strengthen the magnetic field to be applied to the semiconductor. Therefore, it has a wide range of application in solid state electronic equipment and especially in integrated circuit technique.

A few applied inventions concerning the above mentioned basic invention and a related series of improved inventions are as described below.

Previously, the tuning of frequency was attained solely by combining an inductor of a specified value and a variable condenser (varicon) and varying the capacity of the latter by a mechanical means. A complicated mechanism such as the employment of a servomotor was required to operate the automatic tuning.

Recently, an electronic tuning system has been invented which employs a variable capacitance diode which utilizes the fact that the capacity of the PN junction of a semiconductor varies according to the voltage. In this case, however, it is necessary to apply a voltage of over 10 v. across the diode and therefore, the power source for the conventional transistorized radio receiver is not sufficient for the function and as a result a special power source is required. Another defect is that as a DC bias voltage is applied over the tuning unit, a DC circuit and high frequency circuit are connected and great restrictions concerning the circuits are involved.

To solve this problem, these inventors have previously completed a circuit system which employs the previously invented magnetic reactive element as shown in FIGS. 17 and 18 and performs tuning by controlling its inductance or capacitance by electric current through the medium of a magnetic field. As this system is a DC control type, it can employ an automatic tuning method. Besides, since a magnetic field is used as the medium, the DC exciting circuit and the high frequency tuning circuit can be completely separated which is effective for increasing the degree of freedom in the circuit construction reading to the improvement of performance.

In the following, the construction of this invention will be explained according to the embodiment shown in the drawings.

A magnetic inductive element 1 is inserted, as shown in FIG. 19A, into the air gap of the magnetic circuit 3 which generates magnetic flux by passing exciting current I in the exciting coil 2. When voltage resonance is utilized with respect to this device, a condenser 4 of a given value should be connected in parallel with the element 1; then the tuning frequency of this tuning circuit becomes a function of the exciting current and tuning can be performed by controlling the exciting current.

FIG. 19B shows the equivalent circuit of the above. When current resonance is to be used, the element 1 should be connected in series with a condenser of a given value. FIGS. 20A and 20B show the composition and equivalent circuit of the connection. A magnetic inductive element is used in this embodiment. Generally, the value of the inductance generated in these elements is a function of the applied magnetic field and an example of it is shown in FIG. 18. In FIG. 18, the horizontal axis shows the magnetic field in KG and the longitudinal axis the value of inductance in $\mu$H.

If more than two elements are inserted into the air gap of a magnetic circuit, it is possible to control more than two elements at the same time and independently. In FIG. 21 an example of this application in a superheterodyne receiver is shown. In FIG. 21, 7 is a mixer, 8 is an intermediate frequency output, 9 is an intermediate frequency amplifier and 10 is a detector.

According to the above invention, the tuning of frequency can be performed by an electrical means without any movable parts involved. Therefore, the mechanical parts can be eliminated with the resultant miniaturization of the equipment and thus freedom from damage and wear, and a remarkable improvement of reliability can be achieved. Besides, more than two tuning operations can be easily attained at the same time and as the DC circuit for controlling the tuning and the high frequency circuit to be tuned can be separated for independent operation, the design of the circuits becomes easier.

In addition, as the exciting current is only about 1 ma., there is an advantage that an ordinary power source for transistors can be employed as the power supply for the control of tuning. Since the magnetic circuit can be made in an extremely small, the technical value of this invention is very high as an electronic tuning system, and its contribution to the electronic industry is great.

In summarizing, the above-mentioned inventions will be described in the following according to the classification of items.

1. A multiterminal magnetic impedance element in which a number of Hall terminals are provided on a semiconductor element which has a high mobility and high Hall coefficient and a reactive load is connected to each pair of the terminals respectively so that reactance can be generated across the current terminals of the above element by the application of a magnetic field.

2. A magnetic inductance element in which an insulating layer is provided between the N-type semiconductor and the P-type semiconductor and common terminals are attached to the semiconductor so that an inductance can be generated by the application of a magnetic field.

3. A magnetic inductive element of the type described in the item 2 in which a thin dielectric substance is used as the insulating layer.

4. A magnetic inductive element of the type described in the item 2 in which impurities which are to become a P-type semiconductor are diffused on one surface of the N-type semiconductor and an insulating layer is formed in it.

5. A magnetic inductive element of the type described in the item 2 in which impurities which are to become an N-type semiconductor are diffused on one surface of the P-type semiconductor and an insulating layer is formed in it.

6. A semiconductor magnetic inductive element in which on the outer surface of the dielectric layers provided on one or two surfaces of a semiconductor which is equipped with terminals, a number of metal strips are attached keeping a distance between each other and at right angles to the direction of the current so that inductance can be generated by the application of a magnetic field.

7. A magnetic inductive element of the type described in the items (2, 6) in which the insulator is formed by placing an insulating layer of low dielectric constant in the center and mounting insulating layers of high dielectric constant on its both sides.

8. A magnetic inductive element of the type described in the item 7 which the insulating layer located in the center is a vacant space.

9. A semiconductor magnetic inductive element of the type described in the items (2, 6) in which the dielectric is made by the anodic oxidization of the semiconductor itself.

10. A semiconductor magnetic inductive element of the type described in the items (2, 6) in which the dielectric is made by vacuum vapor deposition, sputtering or printing of dielectric material.

11. A semiconductor magnetic inductive element of the type described in the item 6 in which the metal strips are attached by electroplating, vacuum vapor deposition, sputtering or printing.

12. A semiconductor magnetic inductive element of the type described in the item 6 in which the metal strips are electric conductive magnetic material.

13. A semiconductor magnetic inductive element of the type described in the item 6 in which the metal strips have their both ends enlarged in width.

14. A semiconductor magnetic inductive element of the type described in the item 6 in which the dielectric layer has its right and left side portions made thin and its central part thick.

15. A permanently magnetized semiconductor inductor in which permanently magnetized layers are provided on both sides of the semiconductor magnetic inductive element as if to embrace it so that a constant magnetic field can be always applied vertically to the element.

16. A permanently magnetized semiconductor inductor of the type described in the item 15 in which the permanent magnetic substance is enclosed by the magnetic yoke having high permeability.

17. A permanently magnetized semiconductor inductor in which magnetic substances are provided on both sides of a semiconductor magnetic inductive element and they are magnetized in the directions parallel to the boundary surface and opposite against each other so that the magnetic path passes through the element plate.

18. A permanently magnetized semiconductor inductor of the type described in the item 17 in which the parts of the element plate containing a magnetic path of less lines of magnetic force are replaced by metal.

19. Electronic tuning equipment in which a magnetic reactive element inserted into the magnetic circuit is used as a constituent of the tuning circuit and the reactance of the said element is controlled by varying the exciting current so that frequency tuning can be obtained without involving mechanical operation.

20. Electronic tuning equipment of the type described in the Item 19 in which the multiple magnetic reactive elements are inserted into the magnetic circuit.

We claim:

1. A solid-state inductive device comprising a sandwich construction of a N-type semiconductor, a P-type semiconductor and an insulating layer disposed therebetween, and a current electrode interconnecting said semiconductors at each of the opposite ends of said sandwich construction, respectively, whereby said sandwich forms an inductive reactance between said current electrodes upon application of a magnetic field in an angular direction to a side of the sandwich.

2. The device according to claim 1, wherein said semiconductors are rectangular, and which includes an insulating layer the dielectric constant of which is larger at the peripheral edge portions thereof and smaller at the center portion thereof.

3. The device according to claim 1, wherein said semiconductors are substantially flat and said insulating layer comprises a substantially flat ringlike member having an open center whereby said sandwich is formed between the members having a hollow interior.

4. The device according to claim 1, wherein said sandwich construction comprises a PN junction semiconductor.

5. The device according to claim 1, including a magnetic member attached to at least one of the sides of said sandwich construction for the application of the magnetic field.

6. The device according to claim 1, including a magnetic member attached to at least one of the sides of said semiconductor for the application of the magnetic field.

7. A solid-state inductive device comprising a semiconductor having opposite ends and sides, and being substantially electrically conductive, a current electrode connected at each of the opposite ends of said semiconductor, a dielectric layer formed on one side of said semiconductor, and a plurality of metal strips attached on the free surface of said dielectric layer and at an angle to the direction of current flow between said electrodes on the opposite ends, whereby said device forms an inductive reactance between said electrodes upon application of a magnetic field in a direction angular to the plane of said one side.

8. The device according to claim 1, including a second dielectric layer disposed on the other surface of said semiconductor and a plurality of metal strips attached on the free surface of said second dielectric layer.

9. The device according to claim 8, including a yoke having a high permeability surrounding said device.

10. The device according to claim 7, wherein the width of each of said metal strips is wider at the end portions thereof.

11. The device according to claim 7, wherein the thickness of said dielectric layer is smaller at the edge portions thereof.

12. The device as set forth in claim 7, wherein said metal strips comprise a plurality of spaced magnetic members producing the magnetic field.

13. The device according to claim 7, wherein said semiconductors are rectangular, and which includes an insulating layer the dielectric constant of which is larger at the longitudinal peripheral edge portions thereof and smaller at the central longitudinal portion thereof.

14. The device according to claim 13, wherein said dielectric layer is formed of three longitudinal portions extending along an axis between said semiconductor surfaces, the central portion being of lower dielectric constant then the side portion.